(12) United States Patent
Wang et al.

(10) Patent No.: US 10,484,771 B2
(45) Date of Patent: Nov. 19, 2019

(54) SUPPORT FOR VIDEO PLAYBACK DEVICES

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Zhen Wang, Shenzhen (CN); Ching-Feng Chen, New Taipei (TW); Ji-Ping Wu, Shenzhen (CN); Long-Fong Chen, New Taipei (TW)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 144 days.

(21) Appl. No.: 15/605,948

(22) Filed: May 25, 2017

(65) Prior Publication Data

US 2017/0347176 A1    Nov. 30, 2017

(30) Foreign Application Priority Data

May 26, 2016   (CN) .......................... 2016 1 0358437

(51) Int. Cl.
| H04R 25/00 | (2006.01) |
| H04R 1/10 | (2006.01) |
| A47B 97/00 | (2006.01) |
| F16M 13/02 | (2006.01) |
| F16M 13/04 | (2006.01) |
| F16M 11/04 | (2006.01) |
| H04R 1/02 | (2006.01) |

(52) U.S. Cl.
CPC .......... H04R 1/1008 (2013.01); A47B 97/00 (2013.01); F16M 11/041 (2013.01); F16M 13/022 (2013.01); F16M 13/04 (2013.01); H04R 1/105 (2013.01); H04R 1/1058 (2013.01); A47B 2097/006 (2013.01); H04R 1/028 (2013.01)

(58) Field of Classification Search
CPC .... H04R 2499/15; H04R 1/1008; A42B 3/30; A42B 3/042; A42B 1/245; A42B 3/0406; A42B 3/222; A47B 2097/006
USPC .......................................................... 381/376
See application file for complete search history.

(56) References Cited

U.S. PATENT DOCUMENTS

| 2012/0175394 A1* | 7/2012 | Keune .................... F16M 13/04 224/483 |
| 2018/0028058 A1* | 2/2018 | Saidman .................. A61B 3/14 |

\* cited by examiner

*Primary Examiner* — Phylesha Dabney
(74) *Attorney, Agent, or Firm* — ScienBiziP, P.C.

(57) ABSTRACT

A support for video playback devices includes a headwear device, a support mechanism, and a holding mechanism. The support mechanism is connected to the headwear device. The holding mechanism is connected to the support mechanism, and is used to hold a video playback device. Viewing distance and angle of the video playback device is adjusted by varying relative positions of the headwear device and the support mechanism and by varying relative positions of the support mechanism and the holding mechanism. The structure of the support for video playback devices is simple. The support for video playback devices is useful when a user lies down, thus improving the user's sense of experience.

20 Claims, 4 Drawing Sheets

SUPPORT FOR VIDEO PLAYBACK DEVICES

CROSS REFERENCE TO RELATED APPLICATION

This application claims priority to Chinese Patent Application No. 201610358437.1, filed May 26, 2016, the contents of which are incorporated by reference in the entirety.

FIELD

The present disclosure relates to supports for video playback devices.

BACKGROUND

Conventional supports for video playback devices are adapted to be placed on a horizontal surface. The conventional supports for video playback devices are useless when a user lies down, thus causing inconvenience to the user and reducing the user's sense of experience.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
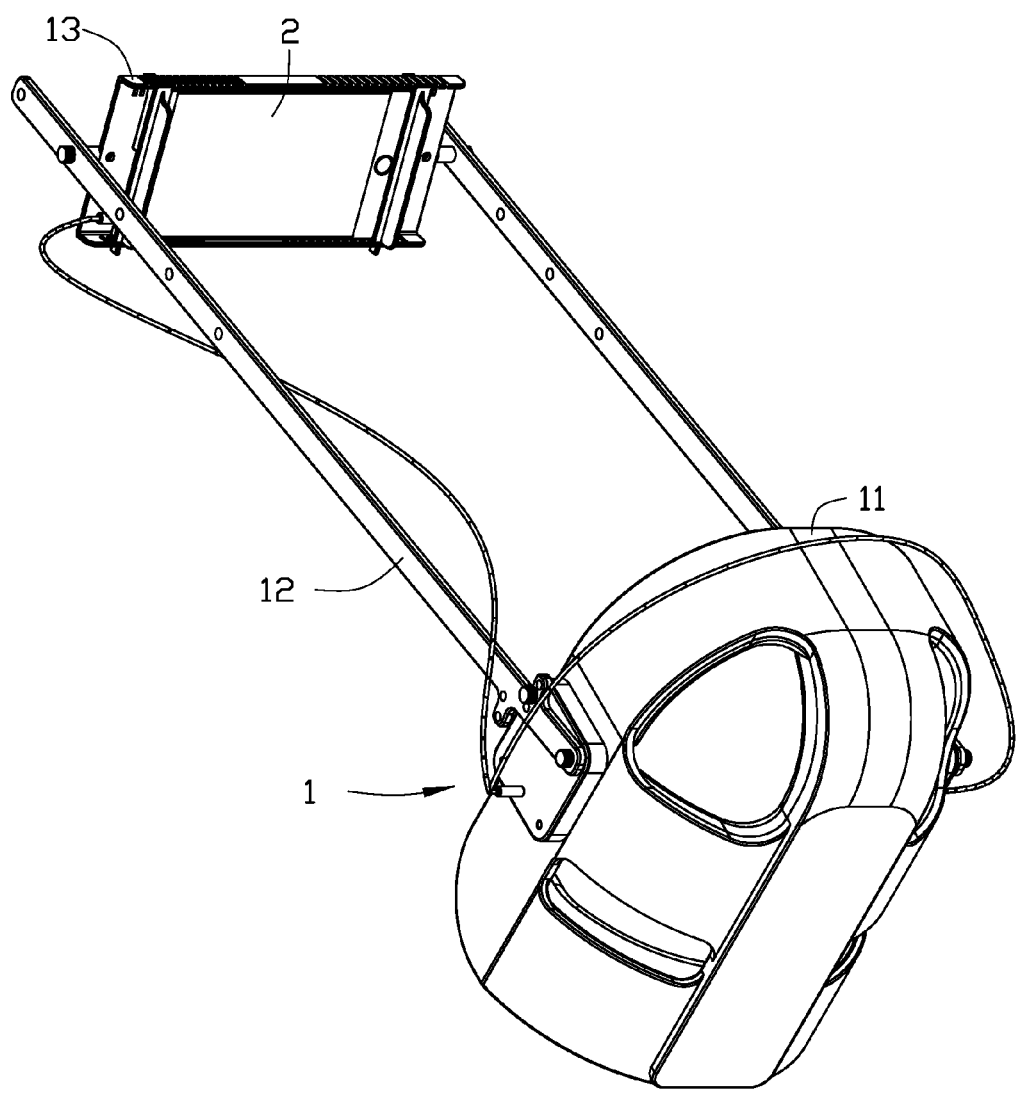
FIG. 1 is a schematic perspective view of a support for video playback devices of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" means "including but not limited to"; it specifically indicates open-ended inclusion or membership in the so-described combination, group, series, and the like.

With reference to FIG. 1, an exemplary embodiment of a support 1 is adapted to support a video playback device 2 for facilitating viewing of the video playback device 2 by a user. The video playback device 2 may be a smart phone, tablet, MP4, and so on. The support 1 includes a headwear device 11, a support mechanism 12, and a holding mechanism 13. The support mechanism 12 is connected between the headwear device 11 and the holding mechanism 13. The holding mechanism 13 is used to hold the video playback device 2. Viewing distance and angle of the video playback device 2 is adjusted by varying relative positions of the headwear device 11 and the support mechanism 12 and by varying relative positions of the support mechanism 12 and the holding mechanism 13.

Figure 2:
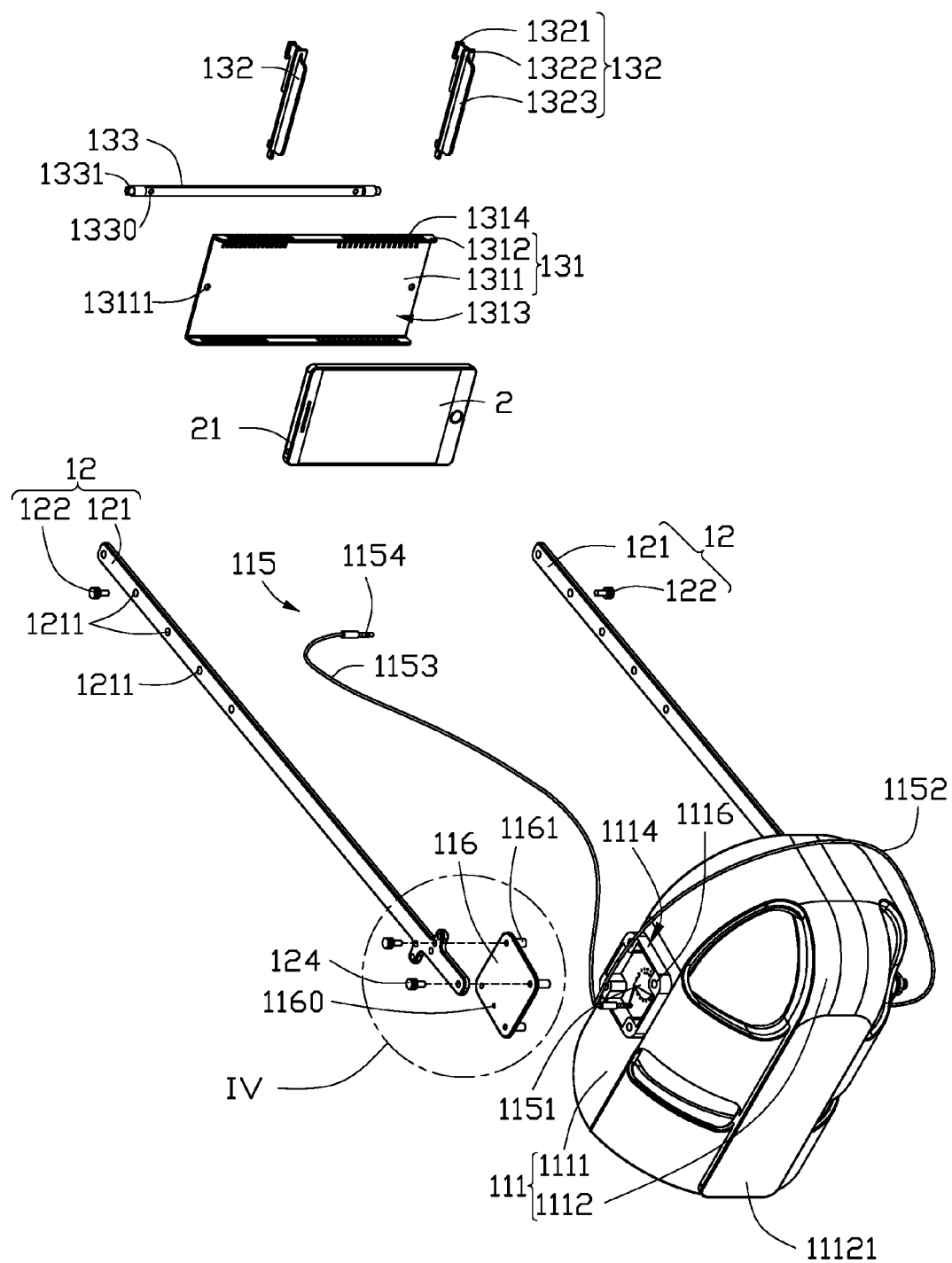
FIG. 2 is a schematic exploded perspective view of the support for video playback devices of FIG. 1.

With further reference to FIG. 2, the holding mechanism 13 includes a holder 131, two positioning members 132, and a space 1313. The holder 131 has a body 1311, two baffles 1312, and a plurality of slots 1314. The body 1311 has an inner surface and an outer surface. The baffles 1312 extend perpendicular from the inner surface of the body 1311. The slots 1314 are formed through at least one of the baffles 1312. The two positioning members 132 are respectively inserted into two of the slots 1314. The space 1313 is defined between the body 1311, the baffles 1312, and the positioning members 132, and is adapted to receive the video playback device 2. The two positioning members 132 may be inserted into different slots 1314 to adjust a size of the space 1313 so as to hold different sized video playback devices 2 in the space 1313. In the present exemplary embodiment, the holder 131 is integrally molded from polypropylene. The body 1311 is rectangular and has two long sides and two short sides. The two baffles 1312 respectively extend perpendicular from the two long sides of the body 1311. The width of each slot 1314 is 4 mm.

Figure 3:
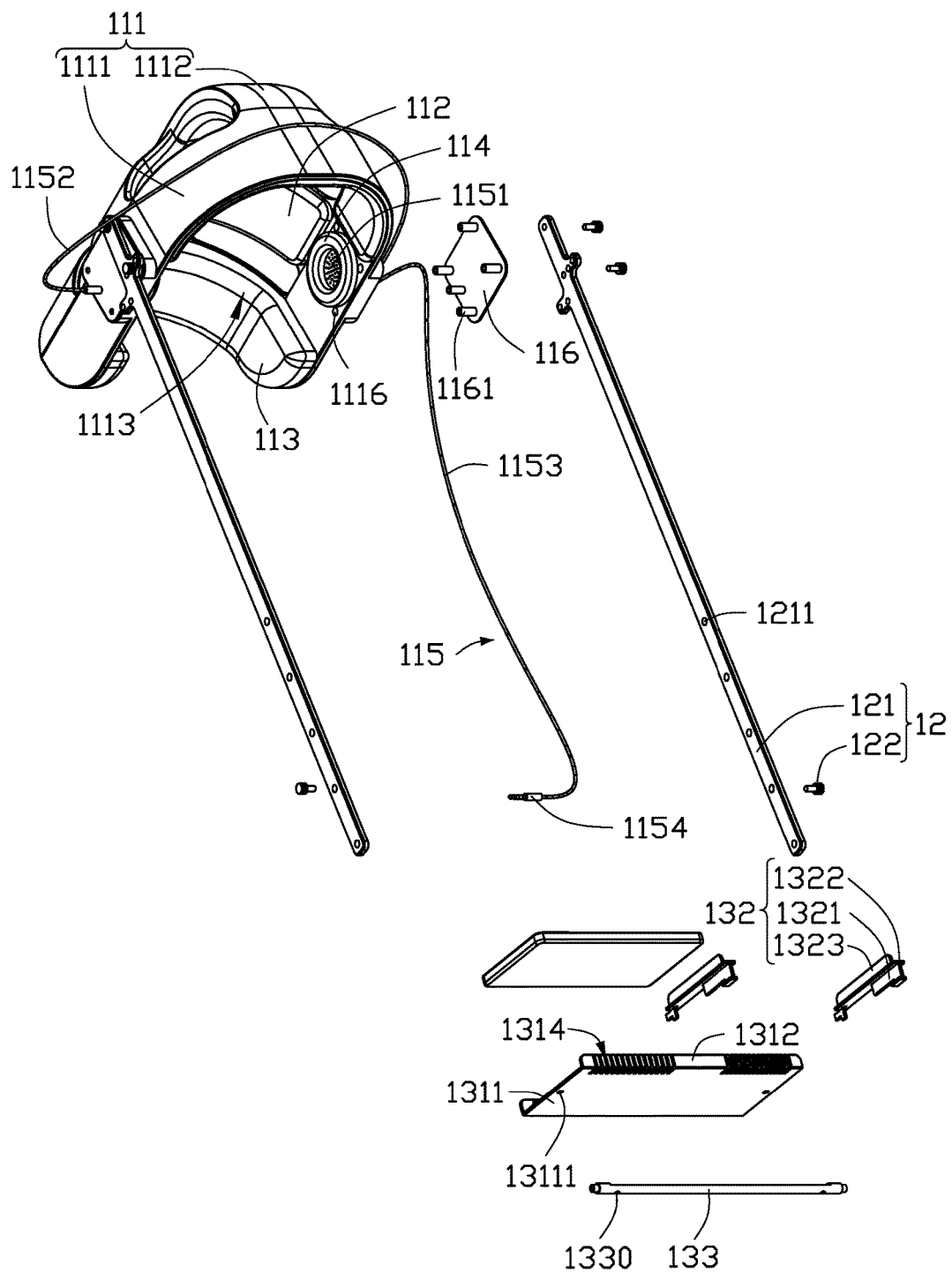
FIG. 3 is a schematic exploded perspective view of the support for video playback devices of FIG. 1 shown in another viewing direction.

With further reference to FIG. 3, in the present exemplary embodiment, each slot 1314 is formed through the at least one baffle 1312 and the body 1311. Each positioning member 132 is integrally molded from polypropylene, and includes an insertion portion 1321, a holding portion 1322, and an operating portion 1323. The holding portion 1322 is adapted to hold the video playback device 2, and has an inner surface and an outer surface. The insertion portion 1321 is formed on the inner surface of the holding portion 1322, and is inserted into the slot 1314. The operating portion 1323 is formed on the outer surface of holding portion 1322, and is provided for the user to insert the insertion portion 1321 into the slot 1314. The contact area between the holding portion 1322 and the video playback device 2 may be adjusted by changing the width of the holding portion 1322, thereby ensuring that the video playback device 2 is securely held by the holding portion 1322.

In the present exemplary embodiment, the body 1311 has two holes 13111. The holding mechanism 13 further includes a shaft 133. The shaft 133 is mounted on a middle portion of the outer surface of the body 1311, and has two holes 1330, and two ends. The two holes 1330 of the shaft 133 respectively align with the two holes 13111 of the body 1311. Two screws respectively pass through two groups of aligned holes 1330, 13111 of the shaft 133 and body 1311 to secure the shaft 133 to the body 1311. The two ends of the shaft 133 respectively protrude from the two short sides of the body 1311. The support mechanism 12 includes two support rods 121 and two first screws 122. Each support rod 121 is integrally molded from polypropylene, and has a plurality of holes 1211 along its longitudinal direction. The two ends of the shaft 133 are respectively inserted into two holes 1211 of the two support rods 121. The two first screws 122 respectively pass through the two ends of the shaft 133 to secure the shaft 133 to the two support rods 121. The two ends of the shaft 133 may be inserted into different holes 1211 of the two support rods 121 to vary the relative positions of the holding mechanism 13 and the support mechanism 12 so as to adjust the viewing distance of the video playback device 2. In another exemplary embodiment (not shown), the support mechanism 12 includes two support rods 121. Each support rod 121 has a chute. The holding mechanism 13 further includes two sliders at its opposite sides. The two sliders are respectively received in the chutes of the two support rods 121. The two sliders may slide in the chutes of the two support rods 121 to vary the relative positions of the holding mechanism 13 and the support mechanism 12 so as to adjust the viewing distance of the video playback device 2. In still another exemplary embodiment (not shown), the support mechanism 12 includes two support rods 121. Each support rod 121 has a groove with teeth. The holding mechanism 13 further includes a shaft 133 having two ends. The two ends of the shaft 133 are respectively inserted into the grooves of the two support rods 121. The shaft 133 may be moved along the grooves of the two support rods 121 to vary the relative positions of the holding mechanism 13 and the support mechanism 12 so as to adjust the viewing distance of the video playback device 2. In still another exemplary embodiment (not shown), the headwear device 11 may be connected to the support mechanism 12 by the connection structure of the holding mechanism 13 and the support mechanism 12 described in the exemplary embodiments above, and the relative positions of the headwear device 11 and the support mechanism 12 may be varied to adjust the viewing distance of the video playback device 2.

In the present exemplary embodiment, the headwear device 11 includes a housing 111, a head pad 112, a neck pad 113, two ear pads 114, an earphone 115, and two covers 116. The housing 111 is integrally molded from polypropylene, is hollow to form a chamber 1113 therein. The chamber 1113 is adapted to receive the head of the user. The head pad 112 and the neck pad 113 are made of a soft material such as foam, and are attached to an inner surface of the housing 111. The thickness of the head pad 112 is 8 mm, and the thickness of the neck pad 113 is 20 mm, to achieve a better user experience. The housing 111 has two side walls 1111 and a connecting wall 1112 between the side walls 1111. The chamber 1113 is defined between the side walls 1111 and the connecting wall 1112. A middle of an outer surface of the connecting wall 1112 is a flat surface 11121. The headwear device 11 can be securely placed on a horizontal surface because of the flat surface 11121. Each side wall 1111 has a receiving member 1114 at its outer surface. The earphone 115 has two speakers 1151, a first wire 1152, a second wire 1153, and a plug 1154. The two speakers 1151 are respectively received in the receiving members 1114 of the two side walls 1111. The two covers 116 respectively cover openings of the two receiving members 1114 to hold the speakers 1151 in the receiving members 1114. The two ear pads 114 are respectively attached to inner surfaces of the two side walls 1111, and respectively correspond to the two speakers 1151. The ear pads 114 are used in conjunction with the speakers 1151 to achieve a better sound effect.

In the present exemplary embodiment, each receiving member 1114 has four holes 1116 at its four corners, and each cover 116 has four protrusions 1161 corresponding to the four holes 1116 of the receiving member 1114. The protrusions 1161 of the two covers 116 are respectively inserted into the holes 1116 of the two receiving members 1114 to secure the covers 116 to the receiving members 1114. Each cover 116 further has a hole 1160. The first wire 1152 has two ends respectively passing through the holes 1160 of the two covers 116 to connect the two speakers 1151. The second wire 1153 has two ends, one of the ends of the second wire 1153 is connected to one of the ends of the first wire 1152, and the other end of the second wire 1153 is connected to the plug 1154. The plug 1154 is connected to the audio jack 21 of the video playback device 2 such that the user can listen to the audio signal of the video playback device 2 through the speakers 1151.

Figure 4:
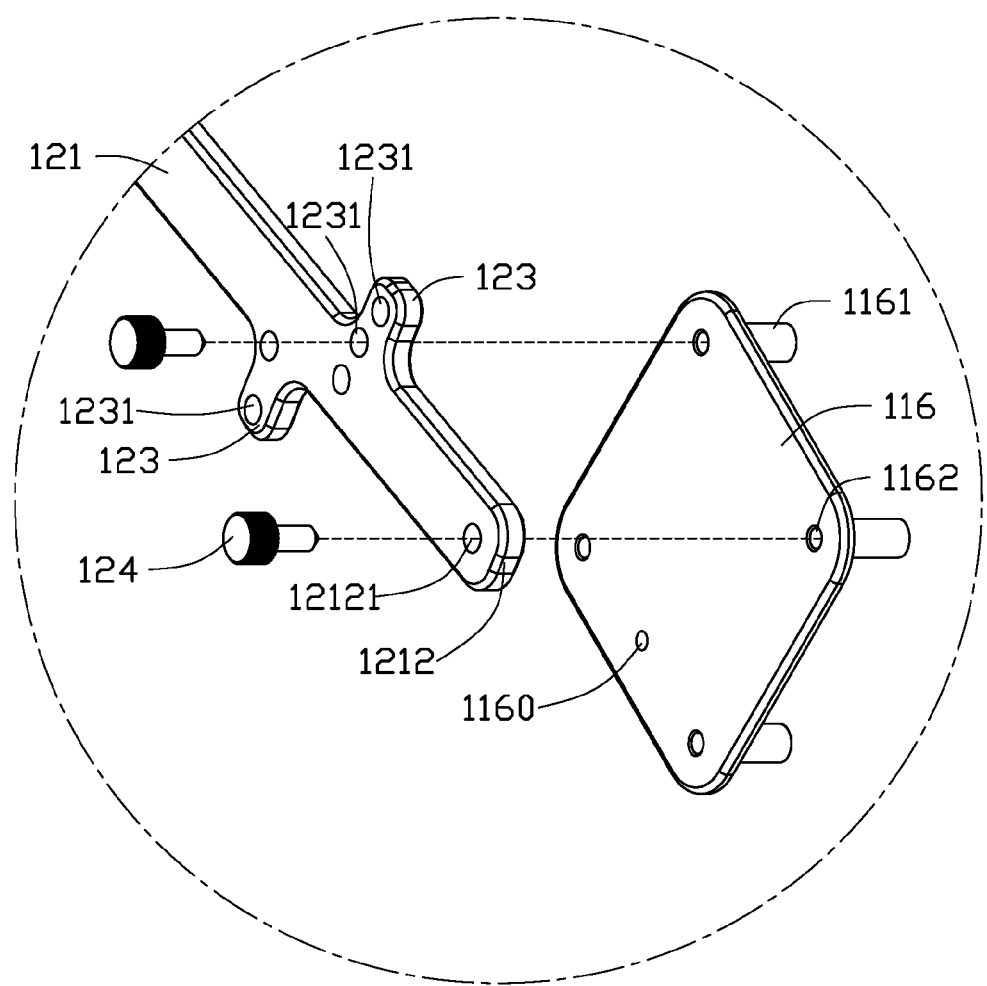
FIG. 4 is an enlarged view of IV in FIG. 2.

With reference to FIGS. 2 and 4, in the present exemplary embodiment, each cover 116 is made of aluminum alloy, and has a plurality of screw holes 1162. Each support rod 121 has an end portion 1212 secured to the headwear device 11, and a plurality of projections 123 extending therefrom adjacent to the end portion 121. The end portion 1212 has a hole 12121. Each projection 123 has at least one hole 1231. The support mechanism 12 further includes a plurality of second screws 124. Two second screws 124 respectively pass through the holes 12121 of the end portions 1212 of the two support rods 121 and respectively pass through two screw holes 1162 of the two covers 116 to secure the end portions 1212 of the support rods 121 to the covers 116, another two second screws 124 respectively pass through the holes 1231 of two projections 123 of the two support rods 121 and respectively pass through another two screw holes 1162 of the two covers 116 to secure the projections 123 of the end portions 1212 to the covers 116, such that the support rods 121 are fixedly mounted to the covers 116. The two second screws 124 may pass through the holes 12121 of the end portions 1212 of the two support rods 121 and pass through different screw holes 1162 of the two covers 116, and the another two second screws 124 may pass through the holes 1231 of different projections 123 of the two support rods 121 and pass through different screw holes 1162 of the two covers 116, to vary the relative positions of the headwear device 11 and the support mechanism 12, so as to adjust the viewing angle of the video playback device 2.

In use, the video playback device 2 is placed in the space 1313 of the holding mechanism 13, and the insertion portions 1321 of the positioning members 132 are inserted into the slots 1314 of the holder 131 such that the video playback device 2 is held by the holding portions 1322 of the positioning members 132. The two ends of the shaft 133 are inserted into different holes 1211 of the two support rods 121, and are secured by the first screws 122, to adjust the viewing distance of the video playback device 2. The two second screws 124 pass through the holes 12121 of the end portions 1212 of the two support rods 121 and pass through different screw holes 1162 of the two covers 116, and the another two second screws 124 pass through the holes 1231 of different projections 123 of the two support rods 121 and pass through different screw holes 1162 of the two covers 116, to adjust the viewing angle of the video playback device 2.

The exemplary embodiments shown and described above are only examples. Many details are often found in the art such as the other features of a support for video playback devices. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A support for video playback devices comprising:
a headwear device;
a support mechanism connected to the headwear device; and
a holding mechanism connected to the support mechanism, and used to hold a video playback device,
wherein a viewing distance and a viewing angle of the video playback device are adjusted by varying relative positions of the headwear device and the support mechanism and by varying relative positions of the support mechanism and the holding mechanism; and
wherein the holding mechanism comprises:
a holder comprising:
a body;
two baffles extending perpendicular from the body; and
a plurality of slots formed through at least one of the baffles;
two positioning members respectively inserted into two of the slots; and
a space defined among the body, the baffles, and the positioning members, and adapted to receive the video playback device.

2. The support for video playback devices of claim 1, wherein the two positioning members are inserted into different slots to adjust a size of the space so as to hold different sized video playback devices in the space.

3. The support for video playback devices of claim 2, wherein each positioning member comprises:
an insertion portion inserted into the slot of the holder; and
a holding portion connected to the insertion portion, and adapted to hold the video playback device.

4. The support for video playback devices of claim 3, wherein each positioning member further comprises an operating portion connected to the holding portion, and provided for a user to insert the insertion portion into the slot.

5. The support for video playback devices of claim 4,
wherein the holding mechanism further comprises a shaft mounted on the body, and having two ends protruding from the body;
wherein the support mechanism comprises two support rods, and each support rod has a plurality of holes along its longitudinal direction; and
wherein the two ends of the shaft are inserted into different holes of the two support rods, and are secured by two first screws, to adjust the viewing distance of the video playback device.

6. The support for video playback devices of claim 5, wherein the headwear device comprises:
a housing having two side walls and a connecting wall between the side walls, and a chamber defined between the side walls and the connecting wall; and
a head pad and a neck pad attached to an inner surface of the housing.

7. The support for video playback devices of claim 4, wherein the headwear device comprises:
a housing having two side walls and a connecting wall between the side walls, and a chamber defined between the side walls and the connecting wall; and
a head pad and a neck pad attached to an inner surface of the housing.

8. The support for video playback devices of claim 3,
wherein the holding mechanism further comprises a shaft mounted on the body, and having two ends protruding from the body;
wherein the support mechanism comprises two support rods, and each support rod has a plurality of holes along its longitudinal direction; and
wherein the two ends of the shaft are inserted into different holes of the two support rods, and are secured by two first screws, to adjust the viewing distance of the video playback device.

9. The support for video playback devices of claim 8, wherein the headwear device comprises:
a housing having two side walls and a connecting wall between the side walls, and a chamber defined between the side walls and the connecting wall; and
a head pad and a neck pad attached to an inner surface of the housing.

10. The support for video playback devices of claim 3, wherein the headwear device comprises:
a housing having two side walls and a connecting wall between the side walls, and a chamber defined between the side walls and the connecting wall; and
a head pad and a neck pad attached to an inner surface of the housing.

11. The support for video playback devices of claim 10,
wherein each side wall of the housing has a receiving member; and
wherein the headwear device further comprises:
an earphone having two speakers respectively received in the receiving members of the two side walls of the housing;
two covers respectively covering openings of the two receiving members to hold the speakers in the receiving members; and
two ear pads respectively attached to inner surfaces of the two side walls of the housing, and respectively corresponding to the two speakers of the earphone.

12. The support for video playback devices of claim 2,
wherein the holding mechanism further comprises a shaft mounted on the body, and having two ends protruding from the body;
wherein the support mechanism comprises two support rods, and each support rod has a plurality of holes along its longitudinal direction; and
wherein the two ends of the shaft are inserted into different holes of the two support rods, and are secured by two first screws, to adjust the viewing distance of the video playback device.

13. The support for video playback devices of claim 12, wherein the headwear device comprises:
a housing having two side walls and a connecting wall between the side walls, and a chamber defined between the side walls and the connecting wall; and
a head pad and a neck pad attached to an inner surface of the housing.

14. The support for video playback devices of claim 2, wherein the headwear device comprises:
a housing having two side walls and a connecting wall between the side walls, and a chamber defined between the side walls and the connecting wall; and
a head pad and a neck pad attached to an inner surface of the housing.

15. The support for video playback devices of claim 14,
wherein each side wall of the housing has a receiving member; and wherein the headwear device further comprises:
an earphone having two speakers respectively received in the receiving members of the two side walls of the housing;
two covers respectively covering openings of the two receiving members to hold the speakers in the receiving members; and
two ear pads respectively attached to inner surfaces of the two side walls of the housing, and respectively corresponding to the two speakers of the earphone.

16. The support for video playback devices of claim 1, wherein the headwear device comprises:
a housing having two side walls and a connecting wall between the side walls, and a chamber defined between the side walls and the connecting wall; and
a head pad and a neck pad attached to an inner surface of the housing.

17. The support for video playback devices of claim 16, wherein each side wall of the housing has a receiving member; and
wherein the headwear device further comprises:
an earphone having two speakers respectively received in the receiving members of the two side walls of the housing;
two covers respectively covering openings of the two receiving members to hold the speakers in the receiving members; and
two ear pads respectively attached to inner surfaces of the two side walls of the housing, and respectively corresponding to the two speakers of the earphone.

18. The support for video playback devices of claim 17, wherein each cover of the headwear device has a hole; and
wherein the earphone of the headwear device further has:
a first wire having two ends respectively passing through the holes of the two covers to connect the two speakers; and
a second wire has two ends, one of the ends of the second wire connected to the first wire, and the other end of the second wire connected to a plug.

19. The support for video playback devices of claim 17, wherein each cover has a plurality of screw holes;
wherein each support rod has:
an end portion secured to the headwear device, and having a hole, and
a plurality of projections extending therefrom adjacent to the end portion, and each projection has at least one hole; and
wherein two second screws respectively pass through the holes of the end portions of the two support rods and respectively pass through two screw holes of the two covers to secure the end portions of the support rods to the covers, and another two second screws respectively pass through the holes of two projections of the two support rods and respectively pass through another two screw holes of the two covers to secure the projections of the end portions to the covers.

20. The support for video playback devices of claim 19, wherein the another two second screws pass through the holes of different projections of the two support rods and pass through different screw holes of the two covers, to adjust the viewing angle of the video playback device.

* * * * *